United States Patent [19]

Konrad et al.

[11] Patent Number: 5,404,508
[45] Date of Patent: Apr. 4, 1995

[54] DATA BASE BACKUP AND RECOVERY SYSTEM AND METHOD

[75] Inventors: Dennis R. Konrad, Welch; Ralph E. Sipple, Shoreview, both of Minn.

[73] Assignee: Unisys Corporation, Blue Bell, Pa.

[21] Appl. No.: 986,155

[22] Filed: Dec. 3, 1992

[51] Int. Cl.⁶ .............................................. G06F 15/40
[52] U.S. Cl. ...................... 395/600; 395/575; 364/DIG. 1; 364/282.1; 364/285.1
[58] Field of Search ............ 395/200, 575, 600; 371/8.1, 9.1, 12

[56] References Cited

U.S. PATENT DOCUMENTS

| | | | |
|---|---|---|---|
| 4,686,620 | 8/1987 | Ng | 364/DIG. 1 |
| 4,714,995 | 12/1987 | Materna et al. | 395/600 |
| 4,751,702 | 6/1988 | Bier | 371/9 |
| 4,959,768 | 9/1990 | Gerhart | 364/187 |
| 5,043,866 | 8/1991 | Myre | 364/DIG. 1 |
| 5,043,871 | 8/1991 | Nishigaki | 364/DIG. 1 |
| 5,086,502 | 2/1992 | Malcolm | 395/575 |
| 5,115,392 | 5/1992 | Takamoto | 395/650 |
| 5,123,104 | 6/1992 | Levine | 395/600 |
| 5,138,710 | 8/1992 | Kruesi | 395/575 |
| 5,170,480 | 12/1992 | Mohan et al. | 395/600 |
| 5,212,772 | 5/1993 | Masters | 395/200 |
| 5,214,768 | 5/1993 | Martin et al. | 395/425 |
| 5,307,481 | 4/1994 | Shimazaki et al. | 395/575 |
| 5,325,519 | 6/1994 | Long et al. | 395/575 |

OTHER PUBLICATIONS

Burkes and Treiber (1990), "Design Approaches for Real-Time Transaction Processing Remote Site Recovery" 35th IEEE Compcon 90. 568-572.

Lyon (1990), "Tandem's Remote Data Facility", 35th IEEE Compcom 90. 562-567.

Haerder and Reuter, "Principles of Transaction-Oriented Database Recovery", Computing Surveys, vol. 15, No. 4, Dec. 1983.

*Primary Examiner*—Thomas G. Black
*Assistant Examiner*—John C. Loomis
*Attorney, Agent, or Firm*—LeRoy D. Maunu; Charles A. Johnson; Mark T. Starr

[57] ABSTRACT

A system and method for maintaining a backup data base. An initial backup copy of a data base is made and stored separate from an active primary data base. Each time the primary data base is updated, audit information pertaining to the data base update is stored in non-volatile storage. A recovery processor continuously reads the audit information from the non-volatile storage and updates the backup data base accordingly, thereby maintaining a backup data base which is nearly up-to-date with the primary data base.

12 Claims, 7 Drawing Sheets

DATA BASE BACKUP AND RECOVERY SYSTEM AND METHOD

CROSS REFERENCE TO CO-PENDING APPLICATIONS

The present application is related to co-pending U.S. patent application Ser. No. 07/762,282 entitled "Cooperative Hardware and Microcode Control System for Pipelined Instruction Execution", filed Sep. 19, 1991 and assigned to the assignee of the present invention. The related patent application is herein incorporated by reference.

BACKGROUND OF THE INVENTION

1. Field of the Invention

This invention generally relates to the area of data base management systems and more particularly to the area of data base backup and recovery.

2. Description of the Prior Art

Businesses and society in general are increasingly relying on the availability of data processing systems and the information they process. The cost of a failed data processing system to a business can be enormous, both in terms of idled resources and the opportunity costs associated with unprocessed information. There may be employees whose Jobs are directly tied to the availability of the system, as well business transactions which are tied to system availability. Thus, when a data processing system fails, there may be costs associated with unproductive labor and lost business opportunities such as sales of airline tickets, sales of shares of stock, or transfers of money. In short, data base availability means the difference between success and failure in the marketplace.

One application for which data processing systems are used and for which system availability is of great importance is in the area of transaction processing. Transaction processing generally entails maintaining a data base of information and processing user requests against the data base. The user requests would typically be for reading, adding, deleting, and updating information in the data base. Each such operation is commonly referred to as a transaction.

Systems which provide transaction processing services are susceptible to failures in at least three different areas of processing, as indicated by Haerder and Reuter in "Principles of Transaction-Oriented Data base Recovery", Computing Surveys, Vol 15, No. 4, December, 1983, pp 287, 290. The failures can be at the transaction level, the media level, or at the system level.

Transaction level failures include things such as incorrect input data and deadlock situations, both of which would keep a transaction from being completely processed. In most instances transaction level failures can be remedied by attempting to reprocess the transaction.

Media level failures include secondary storage device failures, and operating system bugs, both of which can result in failed read or write operations on the secondary storage device. Secondary storage devices are used for non-volatile storage of the data base, and are also useful in applications where the amount of data in the data base exceeds the primary storage capacity of the host system. In the event of a media failure, and especially in the case of a failed secondary storage device, all or part of the information in the data base may be inaccessible. The present invention provides a fast and reliable system for data base recovery as will be discussed in detail later.

The third category of failure discussed by Haerder and Reuter is the system failure. System failures include such things as bugs in the data base management system code, operating system faults, general hardware failures, and natural or human disasters. The consequence of such a failure is that the host system for the transaction processing system is generally unavailable and no further transactions can be processed. Until the system can be returned to an operable state, the activities of those relying on the transaction processing system will be sharply curtailed, if not stopped completely. For system failures caused by disasters such as floods, fires, and acts of terrorism, it would be highly unlikely that the system could be returned at all to an operable state. Protection against disasters is quite often provided by a standby system which is available at a site which is far enough removed from the site suffering the disaster to remove the backup system from the threat of being affected by the same disaster.

The period of time for which a transaction processing application user is willing to forego use of the system due to its unavailability largely depends upon the nature of the application. For example, a home user updating a mailing list application on a system that fails may not feel a great sense of urgency to recover the data held in the inaccessible data base; whereas a large bank whose transaction processing application updates hundreds of thousands of accounts on a daily basis would experience an extreme sense of urgency in recovering its data base. The willingness to invest in the extra equipment necessary to ensure a fast recovery time is largely dependent upon the tradeoff between the down-time costs associated with an unavailable system and the hardware costs to provide a standby system.

Two commonly used methods for data base backup and recovery include the audit trail method and the synchronized data base method. Each is discussed briefly below.

The audit trail method involves making a copy of a primary data base at a selected time. The primary data base is the data base against which transactions are processed, and the copy is referred to as the "backup data base". The backup data base may be stored in a non-volatile storage medium, such as one or more magnetic tapes. After making the backup copy, audit information relating to all updates to the primary data base is logged to an audit trail, which may be stored on a magnetic tape or other non-volatile storage medium. The particular audit information saved may vary from system to system and may include one or more of the following: the new updated record, the old record, the difference between the old record and new updated record, and the operation performed on the record. Only transactions which cause updates to the data base need be logged since operations such as a read will have no effect on the state of the data base.

Should the primary data base become inaccessible, the data in the primary data base must be recovered. The state of the primary data base just after the last update operation can be reconstructed using the backup data base and the audit trail. The backup data base is read from the magnetic tapes and written to a direct access storage device. Then, each entry in the audit trail is sequentially read and applied to the data base on the direct access storage device. When the entire audit trail has been processed, the backup data base will be in a state identical to that of the primary data base Just prior to when it became inaccessible. The backup data base can then be made the primary data base against which subsequent transactions can be processed.

It is recognized that with the audit trail method, the length of time required to recover a data base is directly dependent upon the number of data base updates logged to the audit trail. The number of data base updates logged to the audit trail is directly dependent upon the transaction processing application for which the audit trail is kept. For large banks, the application will most likely involve millions of update transactions, and therefore generate a lengthy audit trail. Thus, a lengthy audit trail will increase the time required to recover the data base.

To ameliorate the lengthy recovery time involved with the audit trail method, a second method, referred to as the "synchronized data base method" is also used for data base recovery. The synchronized data base method involves a primary data base on which transactions are first processed, and secondary data base to which update transactions are applied in order to keep the secondary data base synchronized with the primary data base.

The synchronized data base method involves two hosts: the first host having the transaction processing system for the primary data base, and the second host having a transaction processing system for the secondary data base. Before the transaction processing system for the primary data base completes an update transaction, the update is sent to the transaction processing system for the secondary data base. Once the transaction processing system for secondary data base has received the update transaction, two processing possibilities exist. First, the transaction processing system for the secondary data base could send an acknowledgment to the transaction processing system for the primary data base before the transaction has been applied to the secondary data base to signal that the update transaction has been received. The second approach has the transaction processing system of the secondary data base sending an acknowledgement after the update transaction has been applied to the secondary data base and stored in secondary storage.

The first approach has the benefit that the transaction existence time is not unduly prolonged by virtue of sending the update operation to the transaction processing system for the secondary data base. However, this approach has the drawback that the update transaction is still stored in the primary storage of the second host and has not been applied to the secondary data base secondary storage. The risk taken by this approach is that if the host for the transaction processing system of the primary data base fails, and the host for the transaction processing system of the secondary data base fails before the update transaction can be applied to the secondary storage of the secondary data base, the update transaction will be permanently lost, even though the transaction processing system of the primary data base has proceeded under the assumption that the transaction was secured by the secondary transaction processing system.

The advantage to the second approach is that once the host system with the primary data base has received an acknowledgement, the data base update is sure to be secured in the secondary data base. However, the disadvantage with this approach is that the transaction existence time for the update transaction may be lengthened by the time it takes for the transaction processing system of the secondary data base to make the necessary update to secondary storage. This increase in processing time is due to the fact that the access speed to secondary storage is much slower than the access speed to primary storage. The tradeoff for the security of having the data base update committed to secondary storage is an increase in processing time for a transaction. For applications processing large numbers of transactions this delay may be unacceptable.

The current state of data base backup and recovery systems involves the tradeoff between ensuring data security and minimizing the time to recover a data base. Therefore, it would be desirable for a system to provide a secure backup data base and quick recovery of a data base, without adversely impacting the transaction processing rate.

SUMMARY OF THE INVENTION

1. Objects

It is a general object of the present invention to provide a system and method for maintaining a backup copy of a data base with negligible impact on transaction processing performance.

Another object of the present invention is to provide a system and method for protecting a data base against man-made and natural disasters.

A further object of the present invention is to provide a system and method for fast recovery of a primary data base.

It is yet another object of the present invention to provide an automated system for maintaining a backup data base of a primary data base, whereby operator intervention in maintaining the backup data base is minimized.

2. Summary

The present invention provides a new system and method for maintaining a backup data base, and for providing quick recovery of the backup data base in the event that data base processing on the primary data base becomes inoperable. In the preferred embodiment, the present invention can be practiced with only minor modifications to existing software components, in combination with commercially available hardware components.

The invention entails maintaining a primary data base, against which transactions are processed. Information relating to updates to the primary data base is saved to intermediate storage in what is logically referred to as the audit trail.

A backup data base is established at an arbitrary point in time and saved in storage which is separate from that in which the primary data base is stored. Part of transaction processing entails receiving transactions, updating the primary data base for update type transactions, and saving audit information pertaining to the update transaction to intermediate storage. As audit information is being saved as the audit trail in intermediate storage, the audit trail is continuously monitored. When the audit information becomes available, it is read from the intermediate storage. The backup data base is then updated according to the retrieved audit information.

In the event that processing on the primary data base become inoperable, the backup data base will only be a few transactions behind the primary data base. After all the audit information has been read from intermediate storage and the backup data base has been updated accordingly, subsequent data base transactions can be directed to the backup data base. Because the audit information saved to the audit trail is processed as it becomes available, the time required to bring the backup data base up-to-date and switch operations to the backup data base is substantially reduced. Overall, a substantial reduction in data base recovery time, and a minimal impact on the transaction throughput rate is achieved.

In another aspect of the invention, the backup data base is saved at a site which is separated from the site of the primary data base by a distance sufficient to prevent both the primary and backup data bases from being susceptible to a common disaster. The site of the backup data base is referred to as the "remote site". Likewise, the audit information is saved to intermediate storage at the remote site. As audit information is being saved to the audit trail in intermediate storage at the remote site, the audit trail is continuously monitored. When the audit information becomes available, it is read from the remote intermediate storage and the remote backup data base is updated according to the retrieved audit information. If disaster strikes the site of the primary data base, the backup data base is only a few updates away from being current with the primary data base. Transaction processing can resume once processing of the audit information is complete and communication lines have been switched to direct transactions to the remote site.

The foregoing and other advantages will become apparent upon study of the preferred embodiment as set forth in the Detailed Description and accompanying drawings.

DESCRIPTION OF THE PREFERRED EMBODIMENTS

Figure 1:
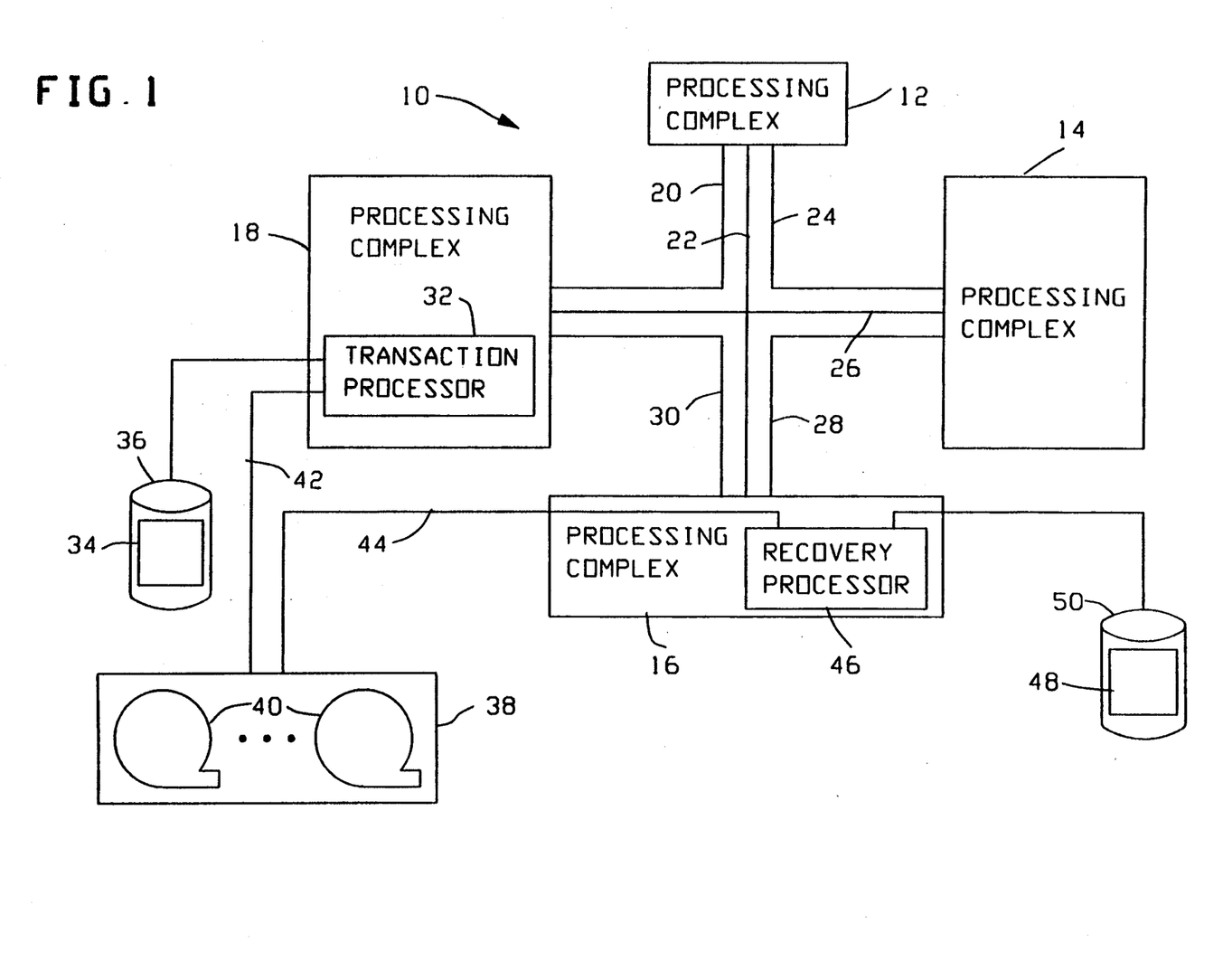
FIG. 1 shows a data processing system in which the present invention could be used.

FIG. 1 shows a data processing system in which the present invention could be used. It should be understood that the present invention could be easily adapted to other data processing system architectures and environments. FIG. 1 is merely illustrative of but one embodiment of the present invention. The block diagram of FIG. 1 depicts a 2200/900 Series Data Processing System 10 which is commercially available from the Unisys Corporation. The overall system architecture is described in the co-pending patent application identified above and is briefly described herein for providing context to a preferred embodiment of the present invention. FIG. 1 is a generalized block diagram of the system architecture described in the co-pending application.

The Data Processing System is comprised of four Processing Complexes, respectively numbered 12, 14, 16, and 18. Each Processing Complex may contain two instruction processors for execution the machine specific instructions. In addition, each Processing Complex also contains main storage units which provide the addressable memory for the instruction processors, and a storage controller for providing an interface between the main storage units and the instruction processors. An input/output section within each Processing Complex provides access to various peripheral storage and communication devices. Each Processing Complex is interconnected with each of the other Processing Complexes via Cables 20, 22, 24, 26, 28, and 30. The interconnection between each of the Processing Complexes allows for sharing addressable memory and peripheral device resources between each of the instruction processors of the respective Processing Complexes.

The architecture of the 2200 Series data processing system allows each Processing Complex to be partitioned into a "stand-alone" data processing system. When a partitioned configuration is made, each stand-alone system executes a separate copy of the OS2200 operating system, thereby providing independent operation of the applications on each partition. Each stand-alone system may also be referred to as "host". For the purposes of this exemplary embodiment, Processing Complex 16 and Processing Complex 16 can be thought of as functionally separate data processing systems.

In an alternative configuration, all the Processing Complexes could be configured in single "tightly coupled" system in which applications in each of the Processing Complexes has access to the resources provided by each of the other Processing Complexes. In a tightly coupled configuration one copy of the operating system manages all the system resources.

Within Processing Complex 18 is a Transaction Processor 32. Transaction Processor 32 provides data base access, both for read and update operations, to Primary Data Base 34. Depending upon the storage requirements of the Primary Data Base 34, part or all of the data base may be loaded in the main storage units (not shown) of Processing Complex 18 for quick access. Secondary Storage Device 36 is used for long term storage of Primary Data Base 34. The Transaction Processor 32 could be either a relational data base management system or a transaction processing system using flat files. Neither the type of transaction processing system nor the structure of data within the data base is necessary for understanding or applying the present invention. Any transaction processing system may benefit from application of the present invention.

Also coupled to Processing Complex 18 is a Intermediate Storage 38. Preferably, the Intermediate Storage 38 shown is a Cartridge Tape Library in which sequential access to data on the Magnetic Tapes 40 is provided to applications seeking to store and retrieve data. The Cartridge Tape Library provides automated tape loading and unloading, thereby eliminating operator intervention for loading tapes. Cartridge Tape Library systems are commercially available from the Unisys Corporation. Those skilled in the art will recognize that many other types of non-volatile storage media are available, each having its particular advantages and disadvantages. Suitable alternatives may include magnetic disks, solid-state disks, cache disks, and others known by those skilled in the art. Many such non-volatile storage media have an available battery backup power supply which further decreases their volatility.

Transaction Processor 32 utilizes the Intermediate Storage 38 for saving audit information for transactions which update the Primary Data Base 34. If, for some reason, the Primary Data Base 34 becomes inaccessible, the audit information can be applied against a backup copy of the Primary Data Base 34 to place the backup copy of the data base in the same state as the Primary Data Base 34 just prior to when it became inaccessible. To provide this capability, each time a transaction involving a data base update is performed, audit information is generated which is stored in Intermediate Storage 38. The audit information saved by the Transaction Processor 32 is the updated record.

In the preferred embodiment, Intermediate Storage 38 provides access to the available storage for multiple Processing Complexes. This is illustrated by coupling Lines 42 and 44. Line 42 couples Processing Complex 18 to the Intermediate Storage 38, and Line 44 couples the Intermediate Storage 38 to Processing Complex 16. Each of Lines 42 and 44 represent the assortment of hardware and software necessary to provide applications in each of the Processing Complexes 16 and 18 with access to data stored in the Intermediate Storage 38. As long as applications on Processing Complex 16 and Processing Complex 18 are not competing for the same resources (e.g. tapes and tape drives) concurrent access is allowed to Intermediate Storage 38.

Recovery Processor 46 in Processing Complex 16 reads the audit information stored in the Intermediate Storage 38 and updates the Backup Data Base 48. As with the Primary Data Base 34, the Backup Data Base is stored in a Secondary Storage Device 50. Backup Data Base 48 is a copy of Primary Data Base 34 made at a particular point in time. To bring the Backup Data Base 48 to the same state as Primary Data Base 34, all update transactions processed after the backup copy of the Primary Data Base was made must be applied to the Backup Data Base 48. Recovery Processor 46 waits for Transaction Processor 32 to save audit information to the Intermediate Storage 38, and when the audit information is available reads the audit information from the Intermediate Storage 38 and applies it to Backup Data Base 48. In this manner, the processing rate of Transaction Processor 32 is not adversely impacted by maintaining Backup Data Base 48; the audits are secure in the event that Primary Data Base 34 becomes unavailable; and Backup Data Base 48 is only a few updates away from being in a state which is equal to the Primary Data Base 34, thereby minimizing data base recovery time. A transaction processor available in Processing Complex 16 could be started to take over the processing which is unavailable in Processing Complex 18.

Figure 2:
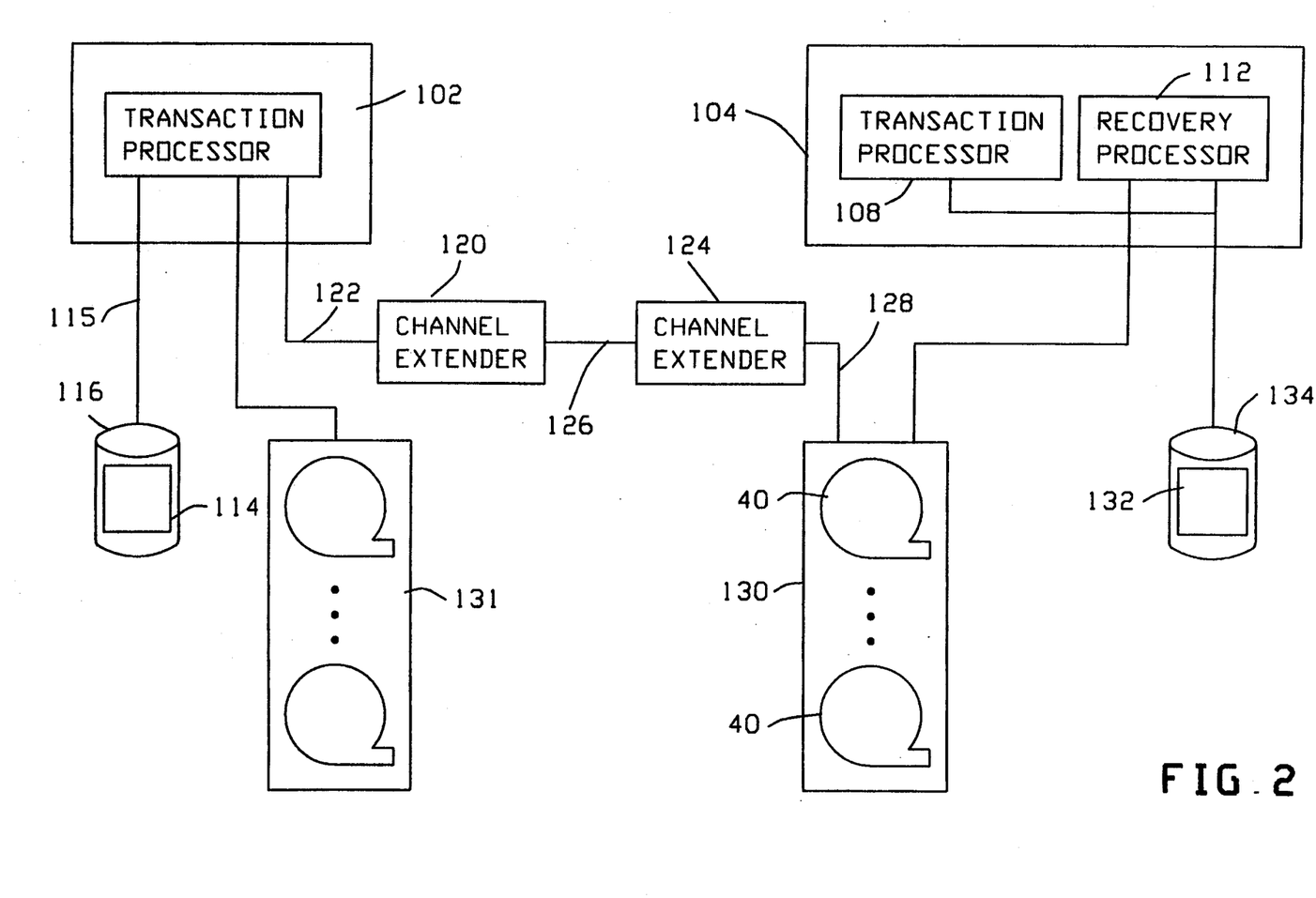
FIG. 2 shows a second embodiment of the overall data processing environment in which the present invention could be used.

FIG. 2 shows a second embodiment of an overall data processing environment in which the present invention could be used. A first "Host" 102, or data processing system, is available for application program execution, and data storage and retrieval. The term "Host" is flexible, but for the purposes of this discussion a Host can be thought of as tightly coupled data processing system. In reference to FIG. 1, if Processing Complex 16 and Processing Complex 18 are partitioned into distinct operating environments, that is, each has its own copy of the operating system, each would be referred to as a Host. On the other hand, if a single copy of the operating system manages the combined resources of Processing Complexes 12, 14, 16, and 18, all four Processing Complexes are configured as a single Host. Host 104 is a second general purpose data processing system capable of executing application programs and providing data storage and retrieval.

Host 102 has a Transaction Processor 106, and Host 104 has a Transaction Processor 108 and a Recovery Processor 112. Transaction Processor 106 is functionally the same as Transaction Processor 32. Different reference numerals are used because of the different processing environments shown in FIGS. 1 and 2. Transaction Processor 106 provides data base access, both for read and update operations, to Primary Data Base 114. Secondary Storage Device 116 provides for long term storage of Primary Data Base 114. Line 115 represents the hardware and software components providing Transaction Processor 106 access to Secondary Storage Device 116. Transaction Processor 108 does not operate on the Primary Data Base 114, but is available to provide the same functionality as Transaction Processor 106 in event that Transaction Processor 106 becomes inoperable.

Transaction Processor 106 is coupled to Channel Extender 120 via Line 122. Line 122 represents the hardware and software components providing Transaction Processor 106 with access to Channel Extender 120. The Channel Extender 120 is commercially available from the Unisys Corporation. It provides a high speed long distance extension to a conventional input/output channel. An additional five to ten kilometers may be added to an input/output channel with a standard Channel Extender. It is contemplated that a Channel Extender with a wide area network configuration may provide an input/output channel extension of approximately 400 kilometers.

Channel Extender 120 is coupled to Channel Extender 124 via Cable 126. Cable 126 could be either a fiber optic cable or a wide area network. Channel Extender 124 converts the channel extender signals from Cable 126 to signals suitable for transmission over Cable 128 to Intermediate Storage 130. Intermediate Storage 130 provides the same functionality as Intermediate Storage 38. Channel Extenders 120 and 124 thereby provide a direct coupling between Host 102 and Intermediate Storage 130, and the capability to store the audit information at a remote location. In the event that a man-made or natural disaster should interrupt or halt Host 102, operations at the remote location may continue unaffected. That is, Host 104 may provide continued service after communications (not shown) have been switched to Host 104.

Transaction Processor 106 may use the coupling to Intermediate Storage 130 for duplex storage of audits. At the same time that audit information is stored in local Intermediate Storage 131, the audit is also stored in remote Intermediate Storage 130 via the high speed link. Thus, the audits are doubly secure. In the event of a media failure by Secondary Storage Device 116, the audits in the local store may be applied to a local backup copy of the Primary Data Base 114 to bring the backup copy of the data base to a state equal to that of the Primary Data Base.

While the preferred embodiment has a direct coupling between Host 102 and Intermediate Storage 130, those skilled in the art will recognize that alternative couplings between Host 102 and Intermediate Storage 130 could be used to achieve the same result. For example, each of Hosts 102 and 104 could be coupled to a communications network (not shown), wherein the communications network provides data transfer facilities for application programs running on each of the Hosts. Instead of having access to Intermediate Storage 130 via the Channel Extenders 120 and 124, Transaction Processor 106 could send the audit information via the communications network to a receiving process on Host 104. The receiving process could then save the audit information to Intermediate Storage 130. In the alternative embodiment, the transaction existence time may be increased by the additional time required to pass the audit information through the added layers of software required for a communications network.

Recovery Processor 112 provides the same functionality as Recovery Processor 46. The only distinction is the differing hardware configurations of FIGS. 1 and 2. Recovery Processor 112 reads the audit information stored in the Intermediate Storage 130 and updates the Backup. Data Base 132. As with the Primary Data Base 114, the Backup Data Base is stored in a Secondary Storage Device 134. Backup Data Base 132 is a copy of Primary Data Base 114 made at a particular point in time. To bring the Backup Data Base 132 to the same state as Primary Data Base 114, all update transactions processed after the copy of the Primary Data Base was made must be applied to the Backup Data Base 132. Recovery Processor 112 waits for Transaction Processor 106 to save audit information to the Intermediate Storage 130, and when the audit information is available, reads the audit information from the Intermediate Storage 130 and applies it to Backup Data Base 132. In this manner, the processing rate of Transaction Processor 106 is not adversely impacted by maintaining Backup Data Base 132; the audits are secure in the event that Primary Data Base 34 becomes unavailable, even if the site of operations of Host 102 is completely decimated; and Backup Data Base 132 is only few updates away from being in a state which is equal to the Primary Data Base 114 just prior to the disaster, thereby minimizing data base recovery time. After Recovery Processor 112 has completed processing the audit information stored in Intermediate Storage 130, the appropriate communication lines can be switched to force subsequent transactions to be routed to Host 104, and Transaction Processor 108 could be started to take over the processing which is unavailable on Host 102.

Figure 3:
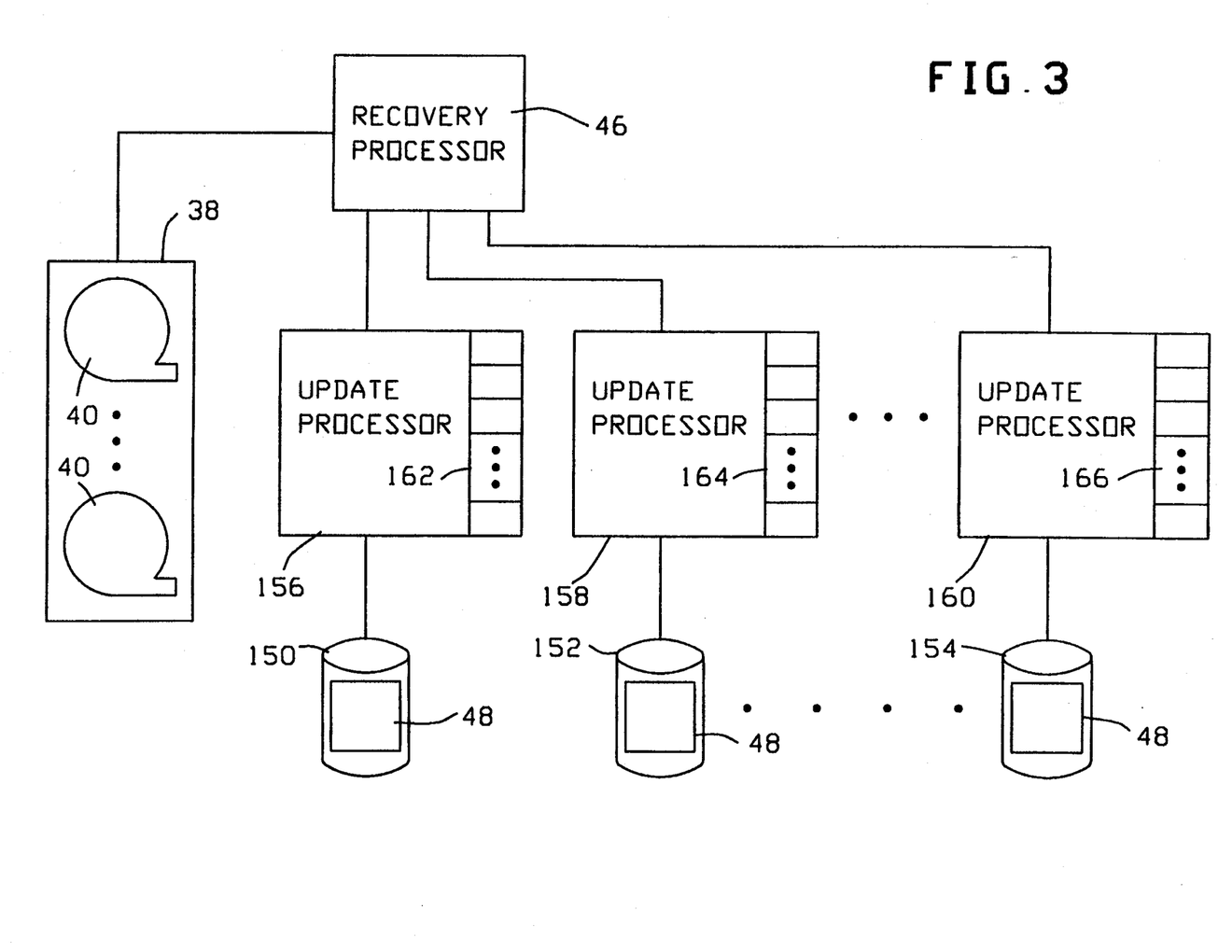
FIG. 3 contains a block diagram of the overall system for recovering audit information from non-volatile storage and applying it to a backup data base.

FIG. 3 contains a block diagram of the overall system for recovering audit information from non-volatile storage and applying it to a backup data base. For many data base applications, the primary data base may be stored across multiple secondary storage devices. The backup data base is similarly stored across multiple secondary storage devices, whereby a portion of the backup data base is stored on each secondary storage device. This is illustrated as Backup Data Base 48 residing on Secondary Storage Devices 150, 152, and 154. Preferably, Secondary Storage Devices 150, 152, and 154 provide direct access to data stored therein, such as magnetic disk systems.

To enhance the rate at which audit information retrieved from Intermediate Storage 38 is applied to the Backup Data Base 48, multiple Update Processors are established to process the audit information against the Backup Data Base 48. For each Secondary Storage Device 150, 152, or 154 on which the Backup Data Base 48 is stored, corresponding Update Processors 156, 158, and 160 are established. Each Update Processor may be implemented as an independent process or application in Processing Complex 16, wherein each Update Processor is started or "forked" by the Recovery Processor 46.

The means through which the Recovery Processor 46 communicates with each Update Processor 156, 158, and 160 is an Audit Queue. Each Update Processor 156, 158, and 160 has an associated Audit Queue, respectively referenced 162, 164, and 166. Each Audit Queue 162, 164, and 166 holds audit information sent from the Recovery Processor, and each entry in an audit queue holds audit information from a particular transaction in which the primary data base was updated. The audit information is read from an Audit Queue on a first-in-first-out basis. Update Processors 156, 164 and 166 read the audit information from their respective associated Audit Queues, 162, 164, and 166, and update the Backup Data Base 48 stored in their respective corresponding Secondary Storage Devices 150, 152 or 154.

The Recovery Processor 46 determines which Secondary Storage Device 150, 152, or 154 holds the portion of the Backup Data Base 48 to which the audit information is to be applied. The appropriate audit information is then sent to one or more of the selected Audit Queues 162, 164, or 166.

Figure 4:
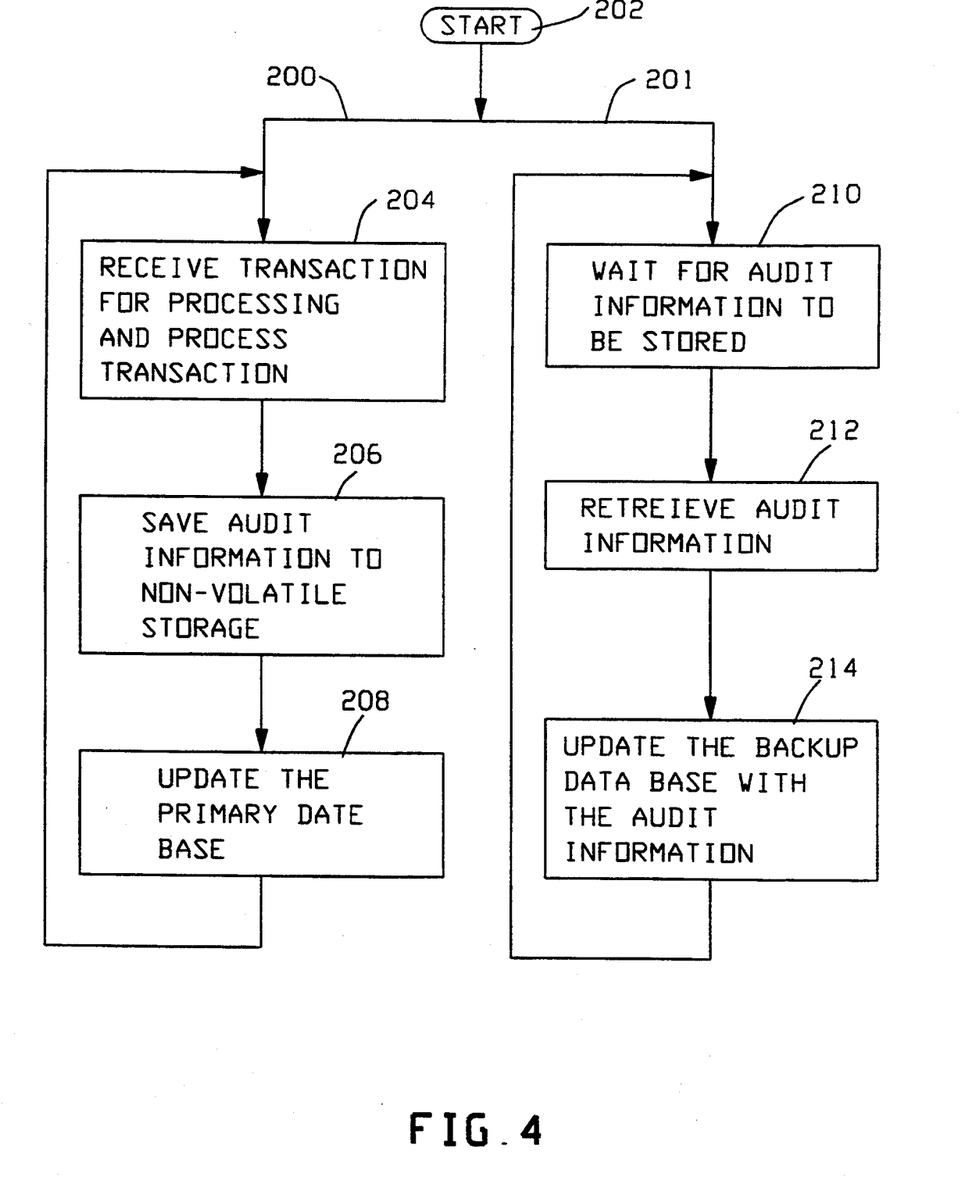
FIG. 4 is a flow chart of the overall processing steps for maintaining a backup data base.

FIG. 4 is a flow chart of the overall processing steps for maintaining a backup data base. There are two processing paths for the overall processing: Path 200 illustrates the overall steps performed by a transaction processor, and Path 201 illustrates the overall steps performed by a recovery processor. The processing for each path proceeds substantially in parallel as explained below.

Step 202 begins the overall processing, and Control Path 200 is followed for general transaction processing, and Control Path 201 indicates general processing for maintaining a backup data base. At step 204 a transaction is received by a transaction processor and processed according to the actions specified in the transaction. A transaction may involve either a reading one or more records from a primary data base, or updating one or more records.

Step 206 saves audit information pertaining to the update operation to non-volatile storage. In the preferred embodiment, the particular audit information is the updated record. In addition, the audit may be stored in duplex fashion.

For update transactions, the primary data base record identified by the transaction is updated at processing Step 208. To ensure that the update has been secured and is not subject to the volatility of data stored in the main memory of a host data processing system, the updated record may be stored in a secondary storage device. After the audit has been stored and the data base record has been updated in a secondary storage device, the transaction is complete and control can be returned to Step 204 to process the next transaction.

At substantially the same time that steps in Control Path 200 are processing transactions, the processing in Control Path 201 is retrieving the audit information saved by Step 206 and applying it against a backup data base. The general steps for maintaining the backup data base are repeated as long as there are update transactions being processed and audit information being stored.

Step 210 waits for audit information to be stored in nonvolatile storage. Depending upon the type of nonvolatile storage chosen, this may entail waiting for access to a particular storage address or waiting for access to a particular storage medium, such as a tape. If the non-volatile storage medium is a magnetic tape, Step 210 would preferably wait until the transaction processor has filled the tape with audit information and thereafter released the tape before proceeding to Step 212. After Step 206 has released the particular resource in which the audit information is stored, Step 212 can proceed in processing the audit information.

At Step 212, the audit information is retrieved from nonvolatile storage and applied to a backup data base. While Steps 204 through 208 continue to process transactions received and save audit information, Steps 210 through 214 continually retrieve the audit information and update the backup data base, thereby keeping the backup data base almost up-to-date with the primary data base.

Figure 5:
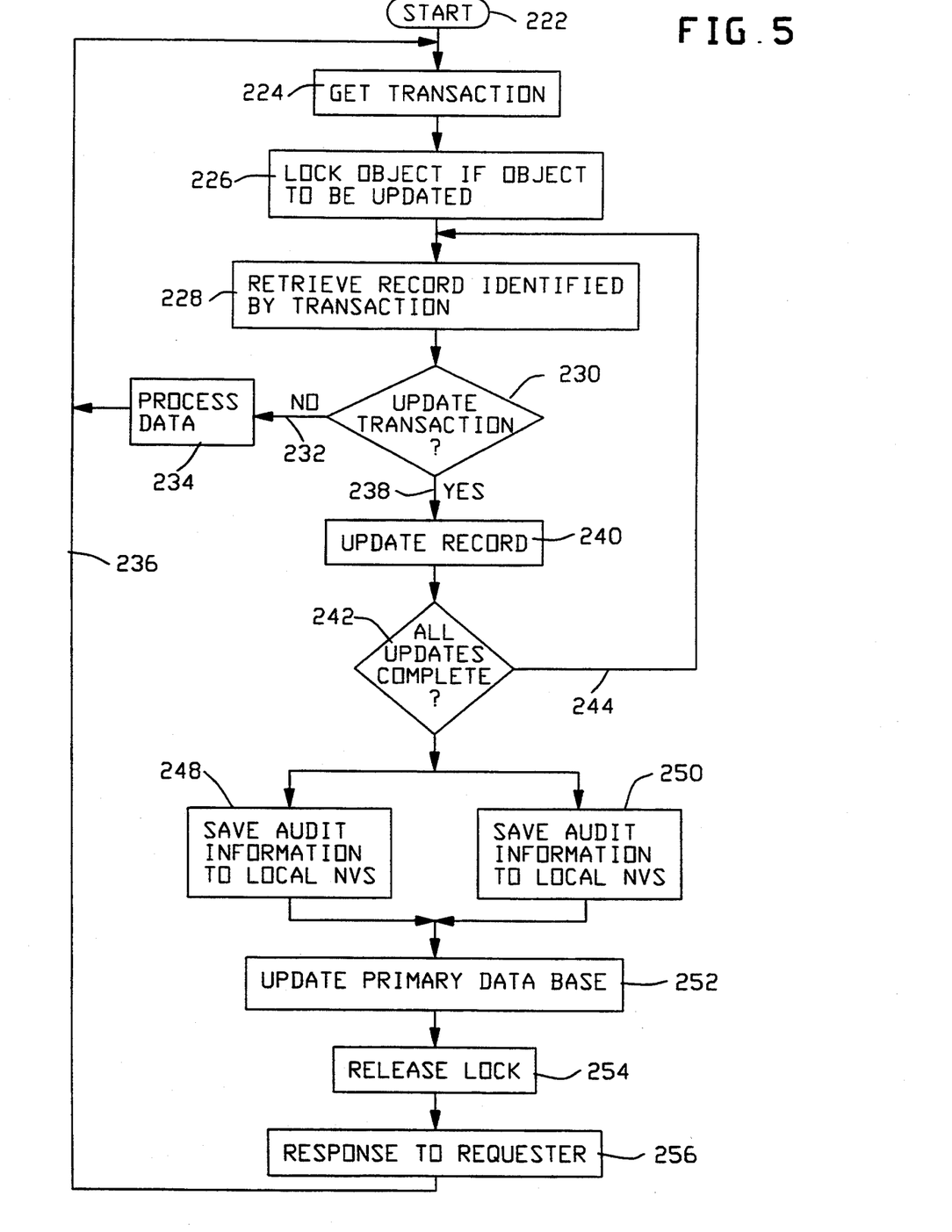
FIG. 5 shows a flow chart of the main processing performed by a transaction processor which provides access to a data base.

FIG. 5 shows a flow chart of the main processing performed by a transaction processor which provides access to a data base. The overall processing entails receiving transactions from a requester, reading a record identified by the transaction, updating the record if necessary, and providing confirmation to the transaction requester. Processing begins at Step 222 and proceeds to Step 224 where a transaction is obtained. Step 226 locks the object referenced by the transaction if the transaction calls for updating the object. The type of object locked will depend upon the application. Some applications may lock a block of storage, others a page of storage, and still others may only lock the particular record to be updated.

Step 228 retrieves the record identified by the transaction and processing proceeds to Test 230. The transaction is tested as to whether it calls for updating the record identified. If not, Control Path 232 is followed to Step 234 where the data is processed accordingly. Step 234 may simply entail returning the data to the requester. Control is returned to Step 224 via Control Path 236.

If Test 230 finds that the transaction calls for updating the identified record, then Control Path 238 is followed to Step 240. Step 240 updates the record according to the operation specified in the transaction.

Test 242 checks whether all the updates called for in the transaction are complete. If there are more records to be updated, then Control Path 244 returns to Step 228. After all the appropriate data base records have been updated, Control Path 246 is followed to Steps 248 and 250.

Each of Steps 248 and 250 saves audit information, and are performed substantially in parallel. Step 248 saves the audit information to local non-volatile storage, and Step 250 saves the audit information to remote non-volatile storage (e.g. Intermediate Storage 130). The stored audit information is the updated object, which may be a page, block or record, depending upon the application.

After the audit information has been saved to both local and remote non-volatile storage, the primary data base in the secondary storage device is updated with the updated object at Step 252. Step 254 then released the lock on the object so that other requesters may read or update the object. Finally, Step 256 sends a response to the requester indicating the status of the transaction. Control Path 236 returns to Step 224 to retrieve the next transaction for processing.

Figure 6:
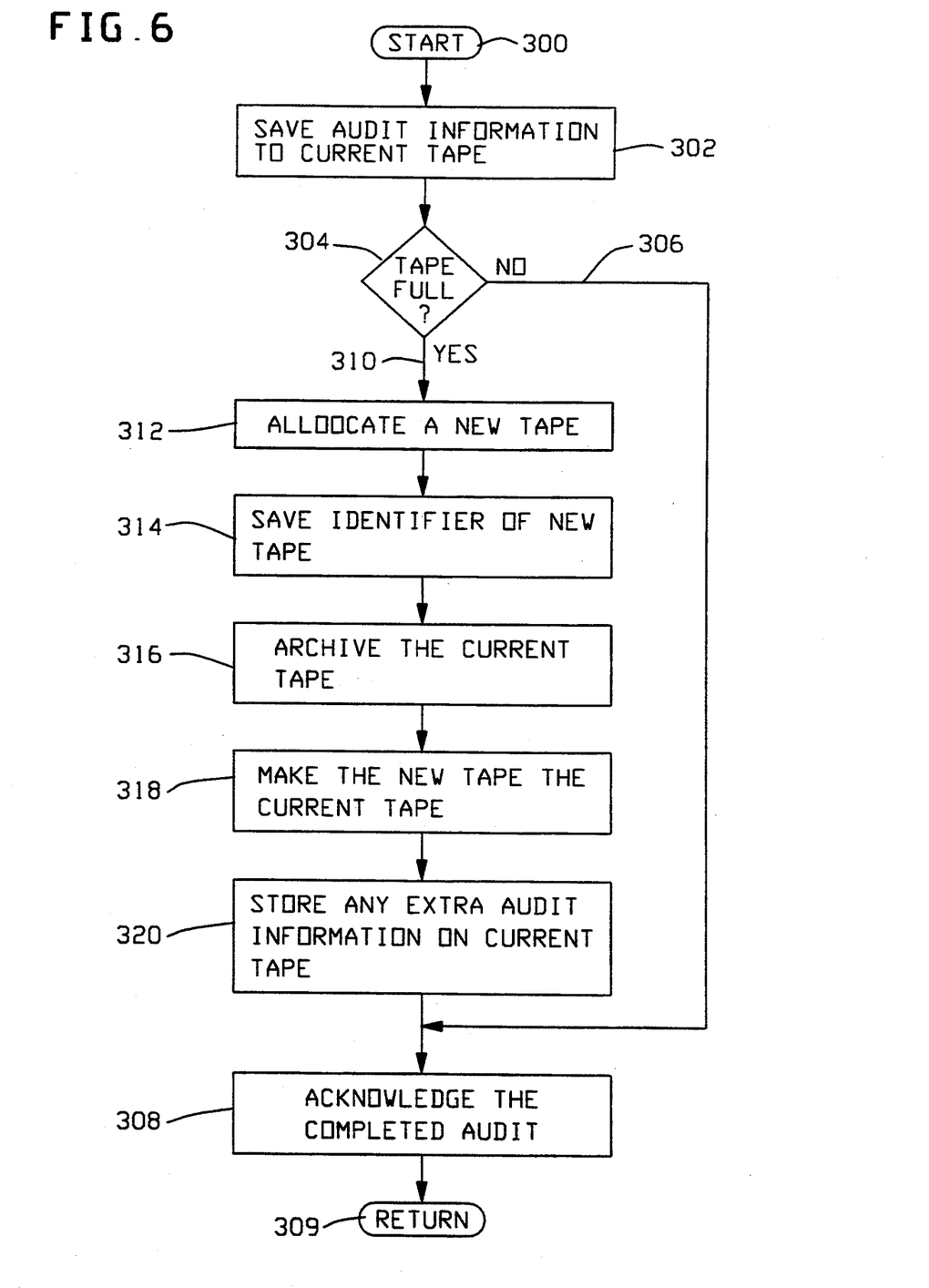
FIG. 6 shows the overall processing for saving audit information pertaining to data base updates to non-volatile storage.

FIG. 6 shows the overall processing for saving audit information pertaining to data base updates to nonvolatile storage. The processing shown for the preferred embodiment assumes that the non-volatile storage is a Cartridge Tape Library system which is commercially available from the Unisys Corporation. Use of the Cartridge Tape Library system provides extremely fast storage of the audit information. The present invention contemplates no changes to existing processing for saving audit information to tape. However, the processing is shown to provide context for the discussion of the processing performed by the recovery processor. It will be recognized that the processing shown in FIG. 6 is not exhaustive; however, an exhaustive discussion is unnecessary for the purposes of the present invention.

Processing begins at Step 300 and proceeds to Step 302 where the audit information is saved to the current tape. This processing assumes that a tape identifier is supplied to indicate the current tape to which the audit information is to be written. Test 304 checks whether the end of the current tape has been reached, indicating that the tape is full. If the tape is not full, then Control Path 306 is followed to Step 308 Step 308 acknowledges that the audit is complete and control is returned so that processing of the next transaction can begin.

If the current tape is full, Control Path 310 is followed to Step 312 where a new tape is allocated. Step 314 then saves the tape identifier for the new tape on the current tape so that a link is established between tapes for recovering the audit information from a sequence of tapes. Step 316 releases the current tape after the link is established, and Step 318 makes the new tape the current tape. The new current tape can thereafter be used for storing addition audit information. If Step 302 failed to save all the audit information to the old current tape, then Step 320 may have to store the portion of the audit information which could not be stored on the old current tape on the new current tape. After the audit processing is complete, acknowledgement is sent to the transaction processor so the next transaction can be processed.

Figure 7:
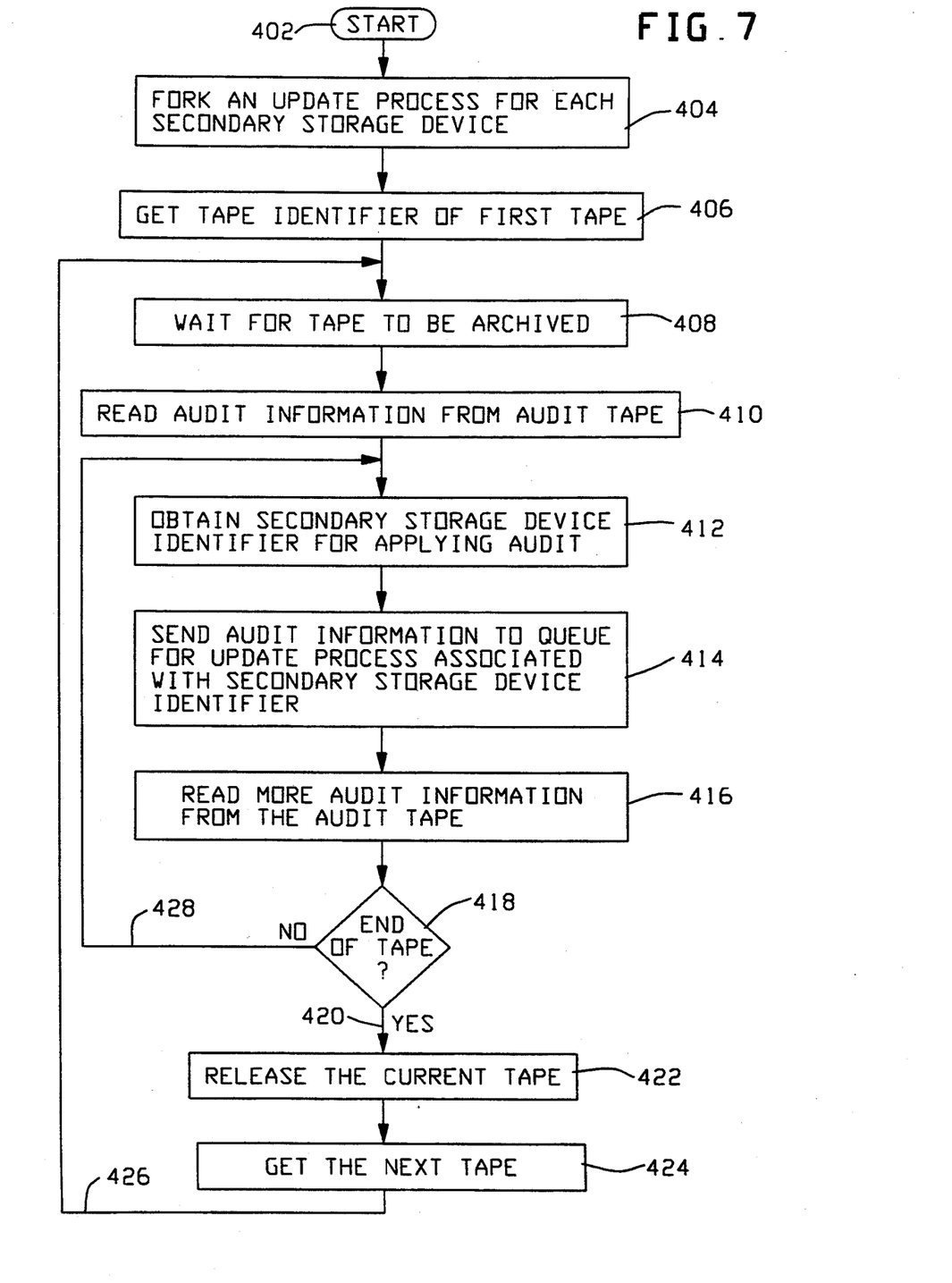
FIG. 7 contains the flow chart for the overall processing of a recovery processor which processes audit information against a backup data base.

FIG. 7 contains the flow chart for the overall processing of a recovery processor which processes audit information against a backup data base. The overall function of the recovery processor is to read audit information from non-volatile storage, and apply the audit information to the backup data base. Prior art recovery processors have an overall function which is much the same as the present invention. However, the distinguishing feature of the preferred recovery processor, is that the prior art recovery processors were invoked in the event that a data base recovery was necessary. The preferred recovery processor is started with a starting tape identifier and runs continuously. After a tape is filled with audit information from a transaction processor, the recovery processor immediately reads the audit information and applies it to the backup data base. The recovery processor processes each tape as it becomes available. In this manner, the backup data base is only slightly out of synchronization with the primary data base.

Processing begins with Step 402 and proceeds to Step 404. Step 404 forks a process for each secondary storage device on which the backup data base is stored. While FIG. 3 shows that the backup data base only occupies one secondary storage device, the backup data base may in fact be stored across multiple secondary storage devices. Therefore, to enhance the rate at which the audit information is applied to the backup data base, a separate update processor is created for each secondary storage device on which the backup data base resides. Each update process has an associated audit queue into which audit information is stored. Each update process reads information from its associated audit queue on a first-in-first-out basis and updates the data on the associated secondary storage device.

Step 406 finds the tape identifier of the first audit trail tape. After retrieving the identifier, Step 408 waits for the tape to become available. If the transaction processor is still saving audit information to the identified tape, the recovery processor must wait until the transaction processor has released the tape.

Once the tape has-been released, Step 410 reads a selected unit of audit information from the tape. Thereafter, Step 412 finds the identifier for the secondary storage device on which the record corresponding to the audit information is stored. Step 414 then sends the audit information to the audit queue for the update processor associated with the secondary storage device identifier obtained at Step 412. The update processor then applies the audit information to the backup data base.

Step 416 reads additional audit information from the audit tape. If the end of the tape is reached, Test 418 forces Control Path 420 to Step 422. The current audit tape is released at Step 422, and Step 424 obtains the tape identifier for the next tape with audit information. Control Path 426 returns to Step 408 to wait for the transaction processor to release the identified tape.

If Test 418 finds that the end of the tape has not been reached, then Control Path 428 is followed to Step 412.

The recovery processor continues to process the audit information stored in non-volatile storage until the transaction processor ceases to save audit information in the non-volatile storage. If disaster was to strike at the site of the local transaction processor, the recovery processor would already be processing the audit information save in the non-volatile storage. Manual or automated intervention could be invoked to switch the communication lines (not shown) so that the backup data base would be made the primary data base as soon as all audit information had been applied to the backup data base. The audit tape to which the transaction processor was saving just prior to the disaster could also be either manually or automatically released when the disaster was discovered, thus allowing the recovery processor access to the audit information stored therein.

While the preferred embodiment has been discussed in terms of a class of data processing systems which are popularly referred to as mainframes, the present invention could easily be adapted to environments employing mini-computers, as well as micro-computers. Those skilled in the art will recognize that various minor modifications to the preferred embodiment could be made to suit the needs of any of the alternative embodiments.

Having described the preferred embodiment of the invention in the drawings and accompanying description, those skilled in the art will recognize that various modifications to the exemplary embodiment could be made without departing from the scope and spirit of the claims set forth below:

That which is claimed is:

1. In a data processing system including a transaction processor for processing transactions against a primary data base and logging audit information related to the transactions, and first and second audit storage devices directly coupled to the data processing system, a method for maintaining a backup data base of the primary data base, comprising the steps of:

establishing a backup data base of the primary data base, wherein the backup data base is initially a copy of the primary data base;

receiving transactions to process against the primary data base;

updating the primary data base according to said transactions;

writing by the transaction processor the audit information in a first audit file stored on the first audit storage device and in a second audit file stored on the second audit storage device;

continuously reading said audit information from the second audit file as said audit information is written and said second audit file is available for reading; and updating the backup data base according to said audit information stored in said storage when said reading step detects that said storage is available.

2. The method of claim 1, wherein the second audit storage device is a tape library system, and said writing in a second audit file step further includes:

requesting a selected magnetic tape from said tape library system;

automatically loading said selected magnetic tape;

writing the audit information in the second audit file on said selected magnetic tape;

automatically unloading said selected magnetic tape when it becomes filled with audit information;

automatically selecting a second magnetic tape after said selected magnetic tape is filled with audit information; and automatically loading said second magnetic tape, whereby said second magnetic tape is available for storage of further audit information.

3. The method of claim 1, further comprising the steps of:

storing the backup data base on two or more direct access storage devices, whereby a different selected portion of the backup data base is stored on each of said direct access storage devices; and concurrently updating two or more of said different selected portions of the backup data base according to the audit information when audit information indicates that two or more of said different selected portions are to be updated.

4. The method of claim 3, wherein the second audit storage device is a tape library system, and said writing step further includes:

requesting a selected magnetic tape from said tape library system;

automatically loading said selected magnetic tape;

writing the audit information in the second audit file on said selected magnetic tape;

automatically unloading said selected magnetic tape when it becomes filled with audit information;

automatically selecting a second magnetic tape after said selected magnetic tape is filled with audit information; and automatically loading said second magnetic tape, whereby said second magnetic tape is available for storage of further audit information.

5. The method of claim 4, further comprising the step of separating the transaction processor and the tape library system by a sufficient distance to reduce the risk that a single disaster would disable both the transaction processor and said storage.

6. A system for maintaining a backup data base of a primary data base, comprising:

a first data processing system;

first secondary storage means coupled to said first data processing system for storing the primary data base;

transaction processing means operable on said first data processing system for providing access to information stored in the primary data base, writing audit information to a first audit file, and writing said audit information to a second audit file, wherein said audit information relates to updates to the primary data base;

first audit storage means coupled to said transaction processing means for storing said first audit file;

second audit storage means directly coupled to said transaction processing means for storing said second audit file;

a second data processing system;

second secondary storage means coupled to said second data processing system for storing the backup data base; and concurrent recovery processing means operating on said second data processing system for processing in parallel with said transaction processing means, reading audit information from said second audit file immediately after said audit information is written and said second audit file is available for reading, and updating the backup data base according to said audit information read from said second audit file.

7. The system of claim 6, wherein said second audit storage means includes tape library means for automatically loading requested ones of a plurality of magnetic tapes, and unloading requested ones of said plurality of magnetic tapes which have been loaded.

8. The system of claim 6, further comprising a channel extender coupled to said transaction processing means and coupled to said second audit storage means.

9. The system of claim 8, wherein said second audit storage means includes tape library means for automatically loading requested ones of a plurality of magnetic tapes, and unloading requested ones of said plurality of magnetic tapes which have been loaded.

10. The system of claim 6, wherein:

said second secondary storage means includes a plurality of direct access storage means for storing the backup data base and providing direct access to the backup data base, wherein a different portion of the backup data base is stored on each of said plurality of direct access storage means;

a plurality of audit queues included in said recovery processing means, wherein each of said plurality of audit queues stores audit information and is associated with a selected one of said plurality of direct access storage means;

a plurality of update processing means included in said recovery processing means for reading said audit information stored in said plurality of audit queues and updating the backup data base, wherein each of said plurality of update processing means is associated with a selected one of said plurality of audit queues, and each of said plurality of update processing means operates substantially in parallel.

11. The system of claim 10, further comprising a channel extender coupled to said transaction processing means and coupled to said second audit storage means.

12. The system of claim 11, wherein said storage means includes tape library means for automatically loading requested ones of a plurality of magnetic tapes, and unloading requested ones of said plurality of magnetic tapes which have been loaded.

* * * * *